Figure 1:
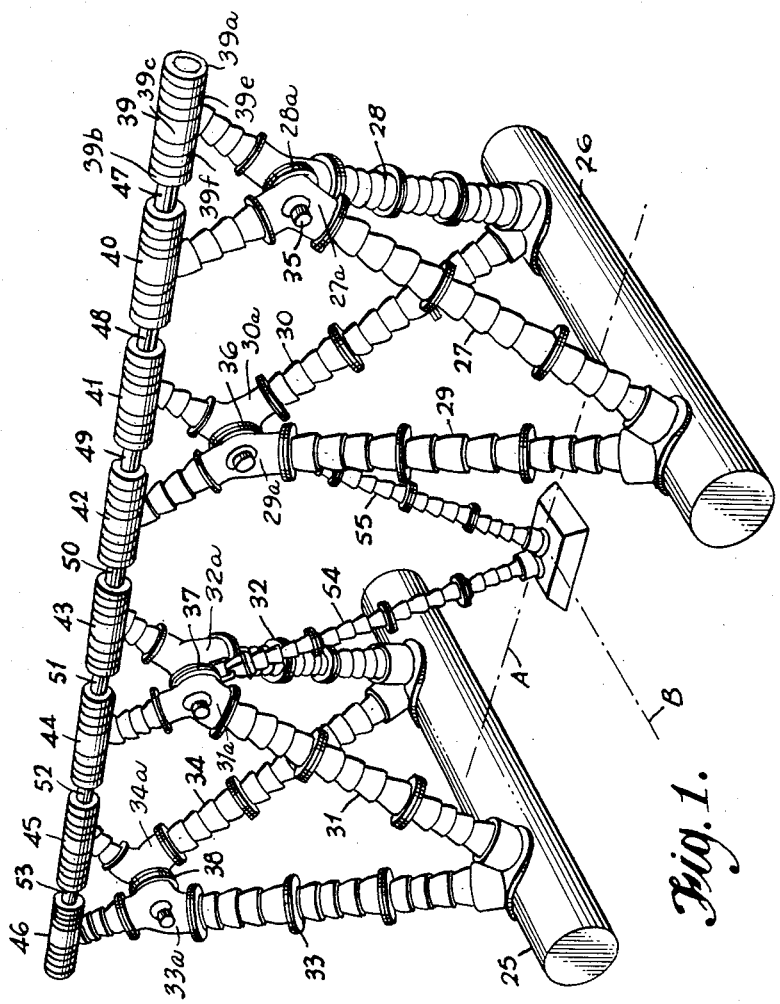

Dec. 18, 1962 A. ROXBURGH ET AL 3,069,521
AIR OR GAS BLAST ELECTRIC CIRCUIT BREAKERS
Filed Nov. 30, 1959 3 Sheets-Sheet 1

INVENTORS
ALBERT ROXBURGH
ALBERT LEIGH
JERROLD JOSEPH FELLERMAN

ATTORNEY

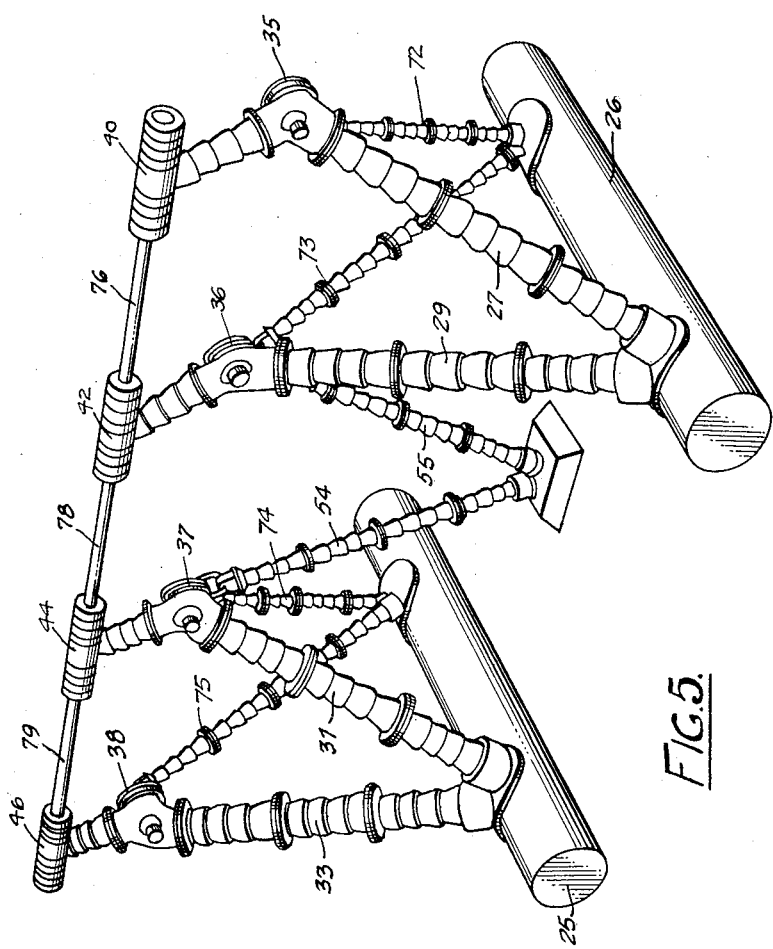

United States Patent Office 3,069,521
Patented Dec. 18, 1962

3,069,521
AIR OR GAS BLAST ELECTRIC CIRCUIT BREAKERS
Albert Roxburgh, Willesden, London, Albert Leigh, Kenton, Harrow, and Jerrold Joseph Fellerman, London, England, assignors to Associated Electrical Industries (Ruby) Limited, a company of Great Britain
Filed Nov. 30, 1959, Ser. No. 856,284
Claims priority, application Great Britain Dec. 2, 1958
9 Claims. (Cl. 200—148)

This invention relates to gas blast electric circuit breakers. The term gas as used throughout this specification includes by definition air.

In a high-voltage air-blast breaker it is necessary to conduct air from an air receiver on or near the ground to blast heads or interrupters which are mounted some distance above. The blast heads which in service are at line potential are insulated from the air receiver by insulating supports normally comprising a stack of porcelain insulators, and the centre of the stack is commonly hollow so that the air can be passed from the air receivers to the blast heads through the stack.

As the operating voltage of the circuit breaker increases and the supports become taller it becomes necessary to provide further support.

A gas blast electric circuit breaker according to the present invention comprises in a phase at least one gas receiver arranged transversely to the phase axis, a plurality of interrupter heads arranged along the phase, two pairs of hollow insulating support columns carried by the gas receiver and leaning outwardly and upwardly one pair on each side of said receiver from substantially the same two axial locations thereon and converging together above the receiver but below the interrupter heads, means connecting the converging support columns mechanically together in the pairs to resist forces side-to-side of the phase, the columns diverging above their connection together and being orientated to carry the interrupter heads, means mechanically interconnecting the interrupter heads along the phase and means extending from the support columns to resist forces end-to-end of the phase.

Conveniently, one support of each pair may not be of hollow construction and terminate at the mechanical connection of the support.

The circuit breaker may have two or more blast heads in a phase and have metal tie bars or other elongated electrically conductive means mechanically connecting them together along the phase but be positioned with such distance between them that each conductive means may be readily replaced by a further blast head carried by a hollow support insulator replacing a non-hollow support insulator to double the initial breaking capacity of the breaker. One of the blast heads carried by the replacement hollow insulators will be connected at one end of the phase so that this head together with the ones inserted between hte original heads will double the capacity. A minimum of dismantling is required to convert the initial installation as the original hollow support insulators and heads retain their initial positions.

The blast heads may be in line, overlapping, or in zig-zag formation in either the horizontal or vertical plane.

In one convenient arrangement using the present invention, two gas receivers each carry two pairs of insulating supports and are arranged with their axes transverse and preferably perpendicular to the phase axis.

A further insulating support or supports may be mounted on the same gas receiver to support a blast head or heads situated between the two pairs of insulating supports.

In one arrangement, which, with double break heads, i.e. double break interrupters, comprises a ten break per phase arrangement, an additional blast head is carried by a vertical insulating support connected to the gas receiver axially intermediate the connection of said two pairs of insulating supports with the gas receiver.

In another arrangement, which, with double break heads, comprises a 12 break per phase circuit breaker, two additional blast heads are carried by a third pair of insulating supports which are connected to the same axial location on the gas receiver as the other pair and converge together in a vertical plane through the axis of the gas receiver and diverge above their mechanical connection.

Several embodiments of air blast breaker according to the present invention will now be described by way of example with reference to the accompanying diagrammatic drawing, in which:

FIGS. 1, 2, 3 and 4 are respective perspective views of one phase of alternative arrangements of the breaker, and
FIG. 5 is a perspective view of a modification of the FIG. 1 arrangement.

In the arrangement shown in FIG. 1 two air cylinders 25 and 26 are parallel and in the same horizontal plane and are arranged transversely to the axis of the phase (indicated by dot-dash line A).

Each air cylinder carries two pairs of insulating support columns indicated at 27, 28, 29 and 30 and at 31, 32, 33 and 34. Each insulating support column is formed by a plurality of stacked hollow porcelain insulators providing passage for air from the air cylinder to double break blast heads (interrupters) 39–46, each of which comprises metal end parts such as 39a, b, separated from a metal center part 39c by insulating parts 39e and 39f. The columns extend upwardly and outwardly of the respective air cylinders as shown. The pairs of columns 27, 28; 29 and 30; 31 and 32; and 33 and 34 converge toward one another and are connected together at 35, 36, 37 and 38 by pin joints acting between metal castings 27a, 28a; 29a. 30a; 31a. 32a; and 33a and 34a.

The insulating support columns 27, 29, 31 and 33 and 28, 30, 32 and 34 extend angularly oppositely to one another above the pin joints as shown, and the double break blast heads 39–46 extend in a line along the phase axis and are connected end-to-end by pin joints, as are indicated at 47–53.

The convergence and connection of the support columns in pairs restricts deflections due to forces parallel to the axis of the cylinders (i.e., parallel to the axis B of the breaker; in other words, side-to-side of the phase axis A). Resistance to deflections due to forces along the axis of the phase is provided by respective strain insulators 54 and 55 which extend from the mechanical connections at 36 and 37 of the inner pairs of support columns along the phase to a location on the axis B of the breaker.

It will be seen that this arrangement allows the use of short air cylinders as one blast valve is provided for each two insulating columns connected to the same axial location on the same air receiver; i.e. one blast valve for each two heads (4 breaks).

Figure 2:
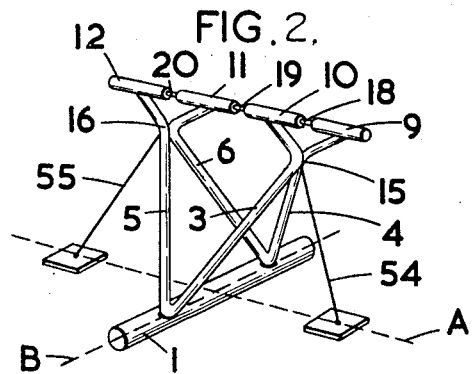

In FIG. 2, an air cylinder 1 is arranged transversely to the axis A of the phase. The air cylinder carries two pairs of insulating support columns indicated at 3, 4 and 5, 6, formed by a number of stacked hollow porcelain insulators as hereinbefore described, providing passage for air from the gas cylinder to blast heads 9, 10, 11, 12, each of which comprises metal end parts separated from a metal centre part by insulating parts as previously described.

The support insulators converge to one another and are connected together in pairs 3, 4 and 5, 6; at 15 and 16 by pin joints acting between metal castings, as in FIG.

1, so that the parts of insulators 3–6 between 15 and 16 and gas cylinders 1 and 2 form triangles, thus providing rigidity to the structure side-to-side of the phase axis. The columns 3 and 4 and 5 and 6 also extend outwardly on each side of the gas cylinder.

The insulators of the pairs 3–6 are inclined above the connections 15, 16 toward opposite ends of the phase axis, so that the blast heads are arranged along the phase axis A as shown. The adjacent metal end parts are connected together by pin joints 18–20. End-to-end (of the phase axis A) location is provided by a pair of strain insulators 54, 55 extending as shown, conveniently to ground.

Figure 3:
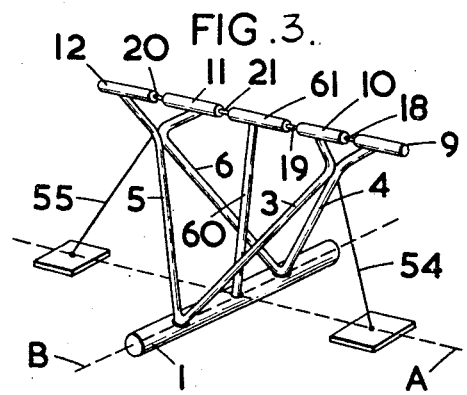

In the modification shown in FIG. 3, which is a 10 break circuit-breaker, an additional vertical support insulator 60 is provided and carries the extra blast heads 61 connected in the system by an extra pin joint 21.

Figure 4:
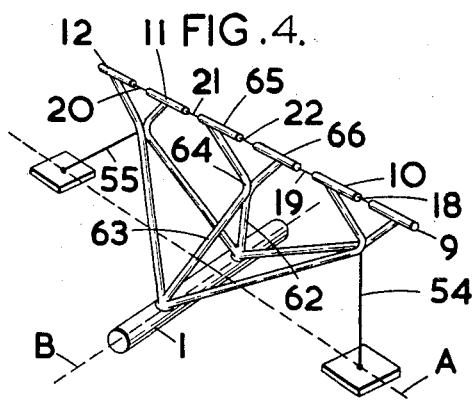

In the modification shown in FIG. 4, which is a 12 break circuit-breaker, an additional pair of converging and diverging support insulators 62 and 63 are connected at 64, and carry additional blast heads 65 and 66, with two extra pin joints 21, 22. In this arrangement, two blast control valves will each serve three blast heads.

Where a pair of gas cylinders are to be arranged alongside one another, particularly as in FIG. 1 one of the support insulators of each pair can be an ordinary insulator; i.e. as shown at 72–75, inclusive of FIG. 5, that is not hollow for gas flow and terminate at 35, 36, 37 and 38; i.e., at the mechanical connection of the pairs of support insulators (see FIG. 5).

In order to provide electrical and mechanical connections between blast heads 40, 42, 44, and 46, metal tie rods 76, 78, and 79 are provided.

In this case the hollow support insulators 28, 30, 32, 34 (FIG. 1) are not initially erected. Ordinary (non-hollow) support insulators 72, 73, 74, and 75 are erected which terminate at 35, 36, 37 and 38. The blast heads 40, 42, 46 are connected by metal tie rods 76, 78, 79.

FIG. 5 provides an arrangement having half the breaking capacity of FIG. 1.

In order to convert the FIG. 5 arrangement to the respective full breaking capacity, the tie rods are replaced by the missing blast heads and the ordinary insulators by hollow insulators.

It should also be appreciated that each or any of the hollow support insulators could be divided above its connection with another support insulator hollow or otherwise, into two or possibly more separate columns or gas paths to support and supply from the same main column two or more blast heads, each of which could have two breaks, so that four or more breaks per main hollow column construction is obtainable. Equally the vertical insulator of FIGURE 3 could be divided in like manner at a location intermediate its ends, say at about the level of the intersections of the other pairs of support insulators.

The pin joints connecting the blast heads may also provide the electrical connection between the blast heads in the phase.

What we claim is:

1. A gas blast electric circuit breaker comprising in a phase at least one gas receiver arranged transversely to the phase axis, a plurality of interrupter heads arranged along the phase, two pairs of hollow insulating support columns carried by said gas receiver and leaning outwardly and upwardly one pair on each side of said receiver from substantially the same two axial locations thereon and converging together above said receiver but below said interrupter heads, means connecting said converging support columns mechanically together in said pairs to resist forces side-to-side of the phase, said columns diverging above their connection together and being orientated to carry said interrupter heads, means mechanically interconnecting said interrupter heads along the phase, and means extending from said support columns to resist forces end-to-end of the phase.

2. A gas blast electric circuit breaker comprising in a phase at least one gas receiver arranged transversely to the phase axis, a plurality of interrupter heads arranged along the phase, two pairs of hollow insulating support columns carried by said gas receiver and leaning outwardly and upwardly one pair on each side of said receiver from substantially the same two axial locations thereon and converging together above said receiver but below said interrupter heads, means connecting said converging support columns mechanically together in said pairs to resist forces side-to-side of the phase said columns diverging above their connections together and being orientated to carry some of said interrupter heads, a vertical hollow insulating support extending upwardly from a location on said receiver axially intermediate said two locations and carrying another of the interrupter heads which is situate in the phase between said heads carried by the respective pairs of converging support columns, means mechanically interconnecting said interrupter heads along the phase, and means extending from said support columns to resist forces end-to-end of the phase.

3. A gas blast electric circuit breaker comprising in a phase at least one gas receiver arranged transversely to the phase axis, a plurality of interrupter heads arranged along the phase, two pairs of hollow insulating support columns carried by said gas receiver and leaning outwardly and upwardly one pair on each side of said receiver from substantially the same two axial locations thereon and converging together above said receiver but below said interrupter heads, means connecting said converging support columns mechanically together in said pairs to resist forces side-to-side of the phase said columns diverging above their connections together and being orientated to carry some of said interrupter heads, a further pair of hollow insulating support columns carried by said receiver and extending upwardly from substantially the same two said locations and converging in a vertical plane through the axis of the air receiver, means mechanically connecting said further columns together to resist forces side-by-side of the plane and said further columns diverging above their connection together and being orientated to carry further of said interrupter heads situate in the phase between said heads carried by the respective pairs of converging support columns, means mechanically interconnecting said interrupter heads along the phase, and means extending from said support columns to resist forces end-to-end of the phase.

4. A gas blast electric circuit breaker comprising in a phase at least one gas receiver arranged transversely to the phase axis, a plurality of interrupter heads arranged along the phase, two pairs of hollow insulating support columns carried by said gas receiver and leaning outwardly and upwardly one pair on each side of said receiver from substantially the same two axial locations thereon and converging together above said receiver but below said interrupter heads, means connecting said converging support columns mechanically together in said pairs to resist forces side-to-side of the phase said columns diverging above their connection together and being orientated to carry said interrupter heads, means mechanically interconnecting said interrupter heads along the phase, and strain insulators extending oppositely along the phase substantially from the connections together of said converging support columns to together provide resistance to forces end-to-end of the phase.

5. A gas blast electric circuit breaker comprising in a phase two substantially parallel gas receivers arranged transversely to the phase axis, a plurality of interrupter heads arranged along the phase, two pairs of hollow insulating support columns carried by each of said gas receivers and leaning outwardly and upwardly one pair on each side of each of said receivers from substantially the same two axial locations thereon and converging together above said receiver but below said interrupter heads, means connecting said converging support columns mechanically together in said pairs to resist forces side-to-side of the phase, said columns diverging above their connection together and being oriented to carry said interrupted heads, means mechanically interconnecting said interrupter heads along the phase, and means extending from said support columns to resist forces end-to-end of the phase.

6. A gas blast electric circuit breaker comprising in a phase two substantially parallel gas receivers arranged transversely to the phase axis, a plurality of interrupter heads arranged along the phase, two pairs of hollow insulating support columns carried by each of said gas receivers and leaning outwardly and upwardly one pair on each side of said receivers from substantially the same two axial locations thereon and converging together above said receiver but below said interrupter heads, means connecting said converging support columns mechanically together in said pairs to resist forces side-to-side of the phase, said columns diverging above their connection together and being orientated to carry said interrupter heads, means mechanically interconnecting said interrupter heads along the phase, and strain insulators extending oppositely along the phase substantially from the connections together of one pair of said converging support columns on each receiver to together provide resistance to forces end-to-end of the phase.

7. A gas blast electric circuit breaker comprising in a phase two substantially parallel gas receivers arranged transversely to the phase axis, a plurality of interrupter heads arranged along the phase, two sets each comprising a hollow insulating support column and a non-hollow insulator carried by each of said receivers and leaning outwardly and upwardly one set on each side of said receivers from substantially the same two axial locations thereon and converging together above said receiver but below said interrupter heads, means connecting said hollow insulating support columns and said insulators together in said sets to resist forces side-to-side of the phase, said support columns being orientated above the connection together of the support columns and the insulators to carry said interrupter heads in spaced relation axially along the phase, and elongated means mechanically interconnecting said spaced interrupter heads and means extending from said support columns to resist forces end-to-end of the phase.

8. A gas blast electric circuit breaker comprising in a phase two substantially parallel gas receivers arranged transversely to the phase axis, a plurality of interrupter heads arranged along the phase, two sets each comprising a hollow insulating support column and a non-hollow insulator carried by each of said receivers and leaning outwardly and upwardly one set on each side of each of said receivers from substantially the same two axial locations thereon and converging together above said receiver but below said interrupter heads, means connecting said hollow insulating support columns and said insulators together in said sets of resist forces side-to-side of the phase, said support columns being orientated above the connection together of the support columns and the insulators to carry said interrupter heads in spaced relation axially along the phase, elongated means mechanically interconnecting said spaced interrupter heads, and strain insulators extending oppositely along the phase substantially from the connection together of one set of converging hollow insulating support columns and insulators on each of said receivers to together provide resistance to forces end-to-end of the phase.

9. A gas blast electric circuit breaker comprising in a phase at least one gas receiver arranged transversely to the phase axis, a plurality of interrupter heads arranged along the phase, two sets each comprising a hollow insulating support column and a non-hollow insulator carried by said receiver and leaning outwardly and upwardly one set on each side of said receiver from substantially the same two axial locations thereon and converging together above said receiver but below said interrupter heads, means connecting said hollow insulating support columns and said insulators together in said sets to resist forces side-to-side of the phase, said support columns being orientated above the connection together of the support columns and the insulators to carry said interrupter heads in spaced relation axially along the phase, elongated means mechanically interconnecting said spaced interrupter heads, and means extending from said support columns to resist forces end-to-end of the phase.

References Cited in the file of this patent

FOREIGN PATENTS

| | | |
|---|---|---|
| 931,565 | France | Nov. 3, 1947 |
| 686,603 | Great Britain | Jan. 28, 1953 |
| 60,645 | France | May 12, 1954 |
| 760,355 | Great Britain | Oct. 31, 1956 |
| 768,053 | Great Britain | Feb. 13, 1957 |

UNITED STATES PATENT OFFICE
CERTIFICATE OF CORRECTION

Patent No. 3,069,521 December 18, 1962

Albert Roxburgh et al.

It is hereby certified that error appears in the above numbered patent requiring correction and that the said Letters Patent should read as corrected below.

In the grant, lines 3 and 4 and line 13, and in the heading to the printed specification, lines 6 and 7, for "Associated Electrical Industries (Ruby) Limited", each occurrence, read -- Associated Electrical Industries (Rugby) Limited --.

Signed and sealed this 3rd day of September 1963.

(SEAL)
Attest:

ERNEST W. SWIDER
Attesting Officer

DAVID L. LADD
Commissioner of Patents